May 20, 1952 R. WESTBURY 2,597,420
APPARATUS OPERATING THE FLYING CONTROLS OF AIRCRAFT
Filed May 31, 1950 7 Sheets-Sheet 1

May 20, 1952 R. WESTBURY 2,597,420
APPARATUS OPERATING THE FLYING CONTROLS OF AIRCRAFT
Filed May 31, 1950 7 Sheets-Sheet 2

Fig. 3.

May 20, 1952  R. WESTBURY  2,597,420
APPARATUS OPERATING THE FLYING CONTROLS OF AIRCRAFT
Filed May 31, 1950  7 Sheets-Sheet 4

Fig. 3a.

Inventor
Roy Westbury
By Moses, Nolte, Crews & Berry
Attorneys

May 20, 1952        R. WESTBURY        2,597,420

APPARATUS OPERATING THE FLYING CONTROLS OF AIRCRAFT

Filed May 31, 1950        7 Sheets-Sheet 5

Fig. 3b.

May 20, 1952   R. WESTBURY   2,597,420
APPARATUS OPERATING THE FLYING CONTROLS OF AIRCRAFT
Filed May 31, 1950   7 Sheets-Sheet 6

Inventor
Roy Westbury
By Moser, Nolte, Crew & Bailey
Attorneys

May 20, 1952   R. WESTBURY   2,597,420
APPARATUS OPERATING THE FLYING CONTROLS OF AIRCRAFT
Filed May 31, 1950   7 Sheets-Sheet 7

Inventor
Roy Westbury
by Moses, Nolte, Crew & Berry
Attorneys

Patented May 20, 1952

2,597,420

UNITED STATES PATENT OFFICE 2,597,420

APPARATUS OPERATING THE FLYING CONTROLS OF AIRCRAFT

Roy Westbury, Oldbury, Bridgnorth, England, assignor to H. M. Hobson Limited, London, England, a company of Great Britain Application May 31, 1950, Serial No. 165,275
In Great Britain June 2, 1949

4 Claims. (Cl. 60—53)

It is known, as a safety measure, in power operated flying control surfaces for aircraft to duplicate the power units so that, should one power unit fail, the other will still be available to move the control surface. In the event of failure of either power unit, it is desirable that the other power unit should be able to operate at full stroke and torque to move the control surface at half the normal speed. One way of achieving this result is to couple the two power units to a common output shaft by a differential gear. In this case, however, provision must be made for locking a failed power unit to ensure that it cannot be driven in reverse, through the differential gear, by the other power unit.

The present invention provides a duplicated power unit, for use in operating the control surface of an aircraft and for other purposes, which does not involve the use of a differential gear, and in which, on failure of either power unit, the system will be able to rotate the output shaft at full torque and half speed.

The duplicated power unit according to the invention comprises a pair of hydraulic actuators (i. e. hydraulic motors or jacks) which are directly coupled to a common output member and each driven by liquid supplied from an independent pump of the constant work type, and means for short-circuiting each actuator, in the event of failure thereof, so that the other actuator may continue to operate the output member. By a pump of the constant work type I mean a pump which, over its operating range, approximates to the theoretical requirement that its delivery pressure should be inversely proportional to its delivery, measured in quantity of liquid per unit time. A suitable pump is that described in British Specification No. 582,182, which comprises a first gear wheel stage and a second plunger stage, the plungers of which are operated by a cam or eccentric with which they are held in contact by the backing pressure of liquid supplied to them by the gear wheel stage, and an off-loading valve, subject to the delivery pressure of the second stage for automatically controlling the delivery of the pump by relieving the first stage pressure back to the inlet side of the pump as the delivery pressure rises. Preferably the off-loading valve operates, as described in United States application Serial No. 165,276 at a predetermined delivery pressure, to render certain plungers of the second stage inoperative, while leaving the others operative.

When pumps of this kind are employed, and both power units are working, the pumps will operate at approximately half their maximum output pressure. When one of the power units fails, the pump of the other unit will step up its output pressure to double the original value and halve its delivery. The pump of the still effective power unit thus, in effect, changes gear when it has to take over the full load.

By "failure" of an actuator I mean failure due to lack of pressure supply or due to seizure of the control valve of the actuator. As the actuators are directly coupled to the output member, short circuiting of the failed actuator, as described in United States application Serial Nos. 164,654 and 164,655, will enable it to move freely as the other actuator continues to operate the output member.

In the case of tandem or series jacks directly coupled to the output member, seizure of either jack piston in its cylinder will, of course, disable the other jack unless it can exert sufficient force to free the seized piston.

In the case of hydraulic motors, these may be mounted in tandem on a common output shaft. Alternatively they may be disposed in parallel, either by arranging for one motor to drive the output shaft and the other a shaft geared to the output shaft, or by arranging for the motors to drive individual shafts both geared to the output shaft. In either of these latter cases the motors may drive their respective shafts at the same or at different speeds. The motors are preferably of a type such that seizure of a plunger or valve in the motor cannot disable the motor.

The hydraulic actuators are, in all cases, directly coupled to the output member. That is to say, there is no differential gear, in the case of hydraulic motors, or differential link in the case of hydraulic jacks, through which a failed and short-circuited actuator could be operated in reverse when the other and still operative actuator seeks to operate the output member. Consequently it is unnecessary to provide locks for preventing the failed actuator from being driven in reverse by the other actuator.

The invention will now be described in further detail, by way of example, with reference to the accompanying drawings, in which.

Like reference numerals indicate like parts throughout the figures.

As has been mentioned, the two hydraulic actuators are directly coupled to a common output member. That is to say the actuators are so coupled to the output member that, if one actuator should fail, it cannot be driven in reverse by the still operative actuator.

Figure 2:
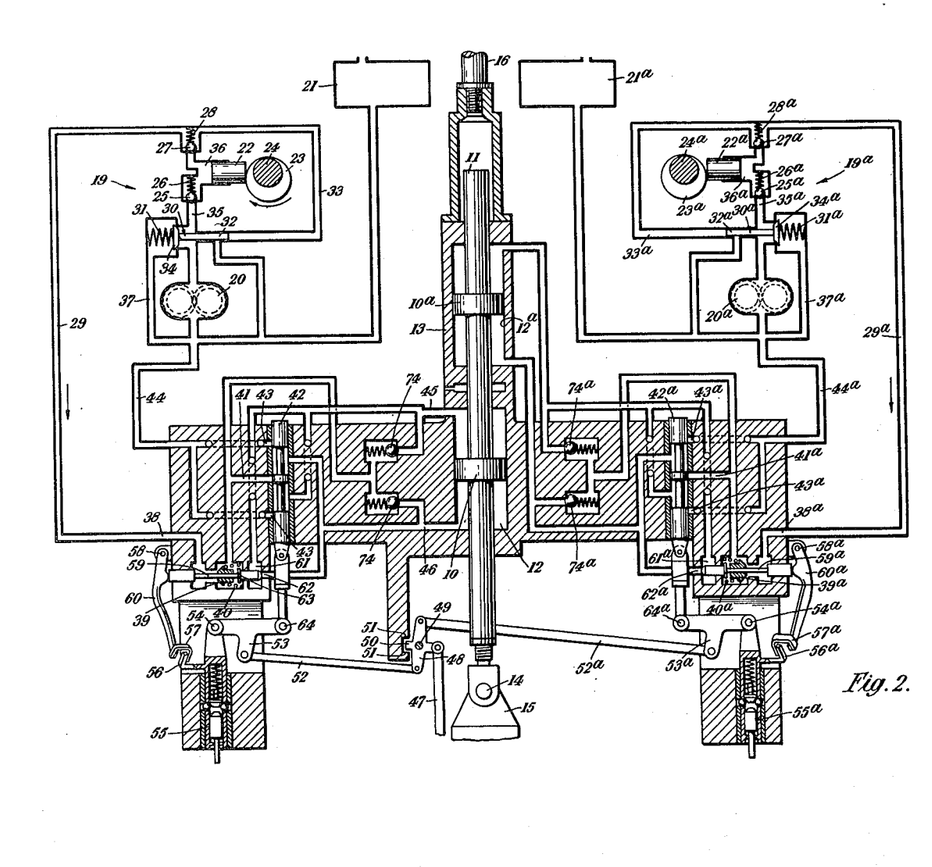
Fig. 2 is a diagram showing a duplicated hydraulic power unit according to the invention including two jacks in tandem, Figs. 3, 3a and 3b constitute a diagram showing a duplicated hydraulic power unit according to the invention including two hydraulic motors in parallel.

In the case of hydraulic jacks, these may be arranged in tandem, as shown in Fig. 2. Here two jack pistons 10, 10ª are shown, mounted on a common piston rod 11, pivoted at 14 to a fixed structure 15, the pistons being movable in bores 12, 12ª in a cylinder block 13, an extension 16 of which constitutes a common output member and is coupled to a flying control surface or other apparatus to be operated by the duplicated power unit.

Figure 1:
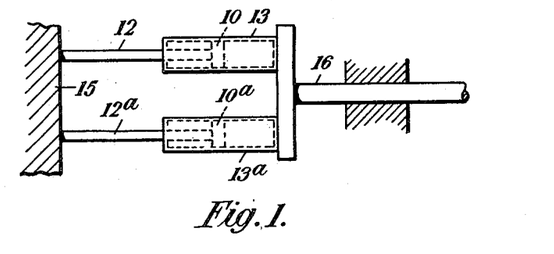
Fig. 1 is a diagram showing two hydraulic jacks arranged in parallel and directly coupled to a common output member.

As an alternative, and as shown in Fig. 1, the jacks may be arranged in parallel, the two piston rods 12, 12ª being attached to a fixed structure 15 and their cylinders 13, 13ª being directly coupled to the common output member 16.

In neither of these cases can either jack be operated in reverse by the other in case of failure, such as would be the case, in the parallel arrangement of Fig. 1, were the movable cylinders 13, 13ª coupled to the output member 16 by a differential link, such for example as that shown in copending United States application Serial No. 164,654. Consequently no lock need be provided for locking either jack cylinder against movement in relation to its respective piston in the event of failure.

Figure 3:
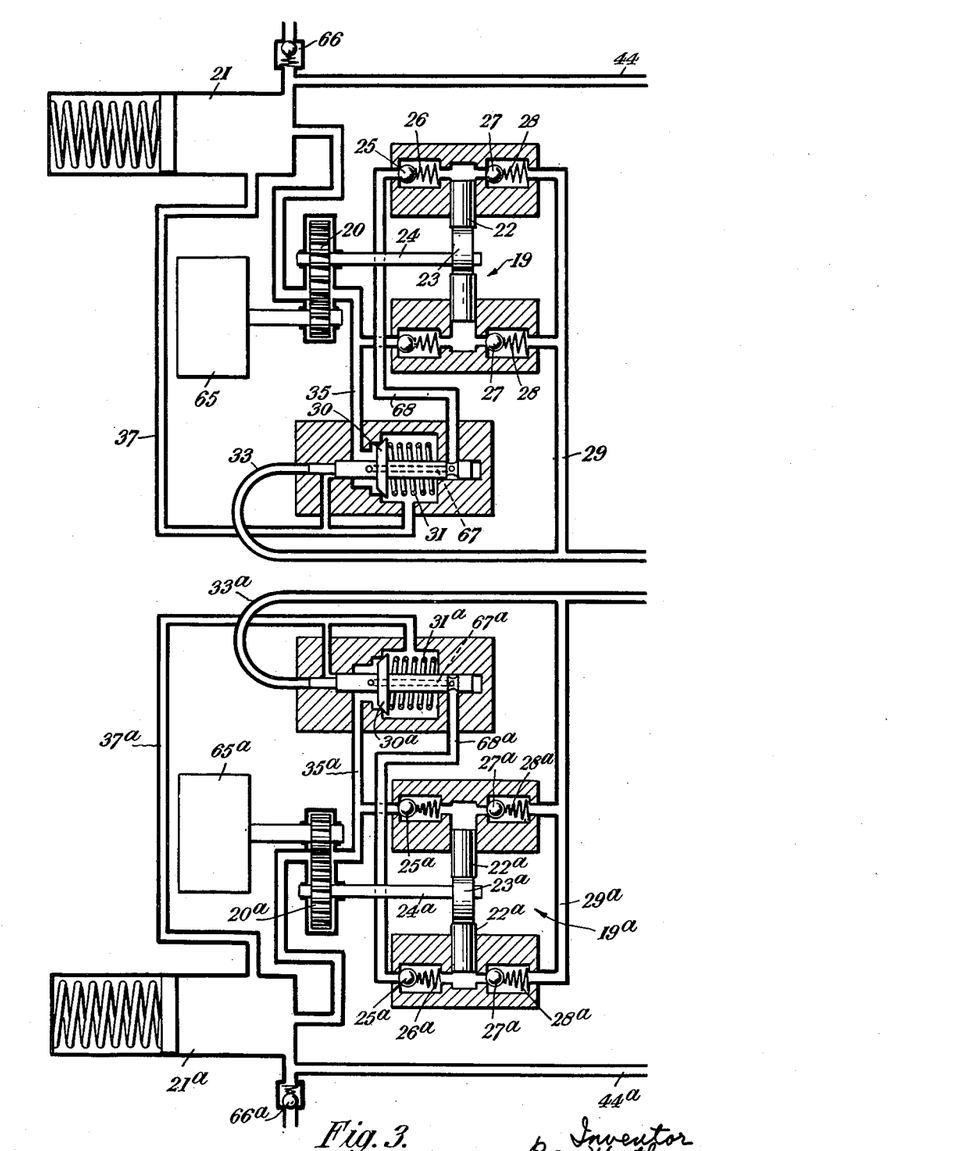
Figure 3A:
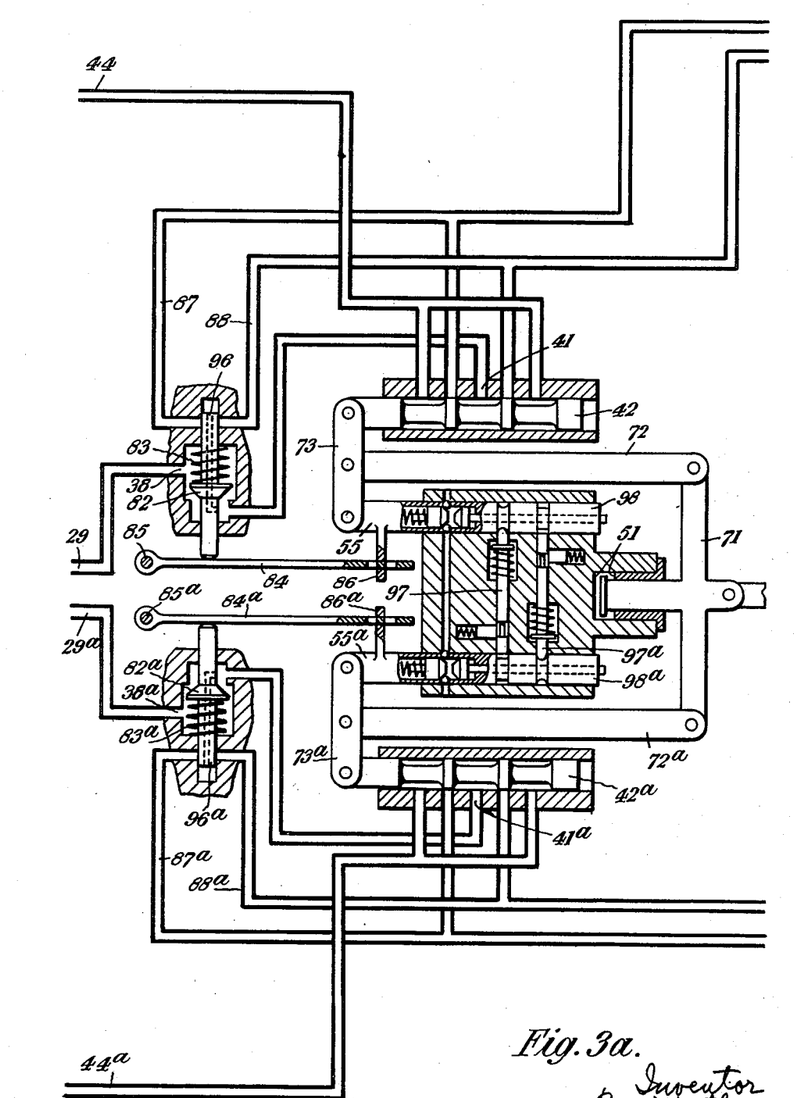
Figure 3B:
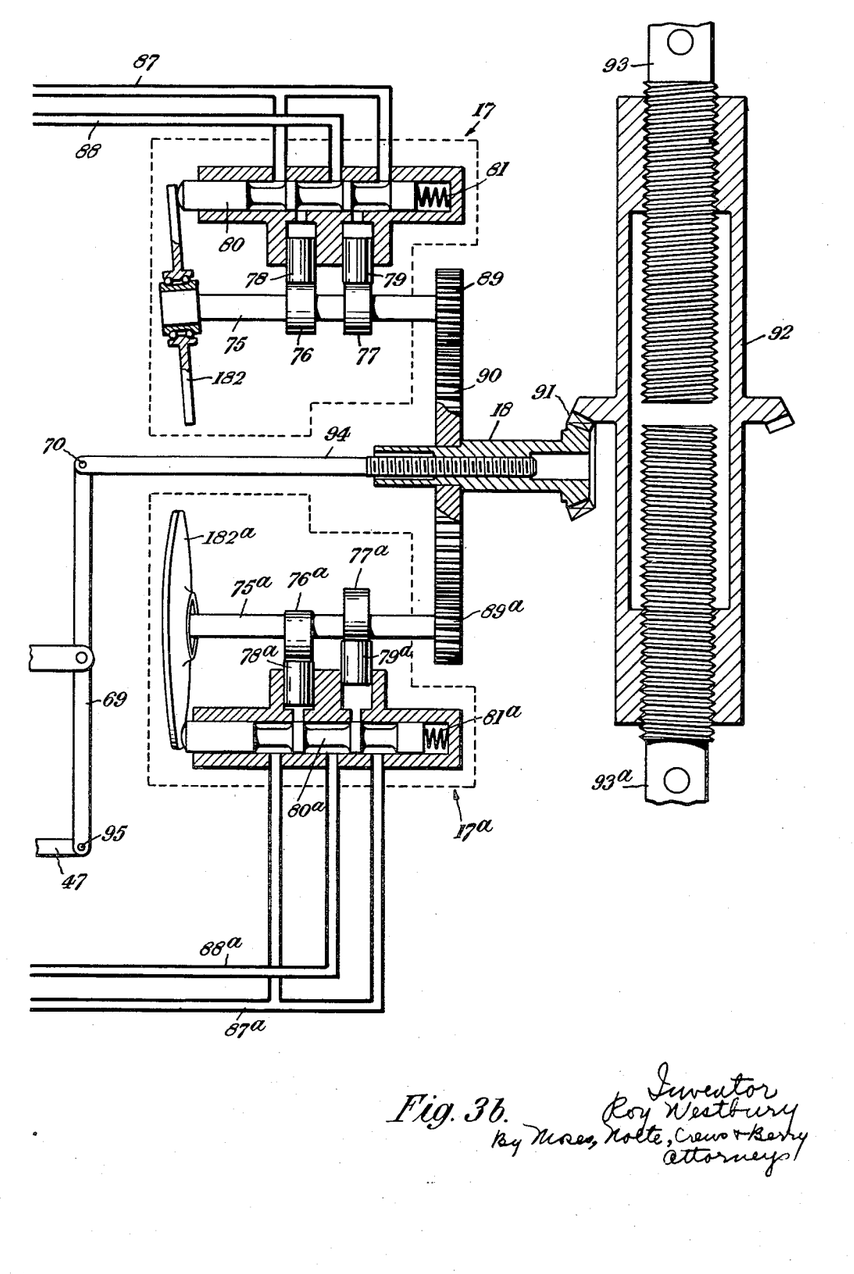

It has already been stated that, in the case of hydraulic motors, these can be mounted in tandem on a common output shaft. An example of the invention, showing parallel hydraulic motors 17, 17ª geared to a common output shaft 18 is shown in Figs. 3, 3a and 3b.

Turning now to Fig. 2, each of the jack cylinders 13, 13ª is supplied with working fluid from an associated constant work pump 19, 19ª. But one of the constant work pumps, and the control mechanism for the associated jacks will be described. Corresponding parts in the other case are marked with the same reference numerals, with the addition of the suffix a.

The constant work pump 19 is of the construction described in British Specification No. 582,182. It comprises a first gear wheel stage 20, which draws liquid from a reservoir 21, and a second plunger stage, comprising seven plungers 22 disposed radially in relation to a cam 23 on the pump shaft 24, which imparts delivery strokes to the plungers in their respective cylinders 36. But one of the plungers 22 is shown in the diagram of Fig. 2. Each plunger 22 is caused to perform its return stroke by the backing pressure supplied to it from the gear stage 20 through an inlet valve 25 loaded by a spring 26, and delivers liquid under pressure, through a delivery valve 27, loaded by a spring 28, to a delivery line 29 common to all the plungers.

An off-loading valve 30, biassed to closed position by a spring 31 has a stem 32 subject to delivery pressure through a line 33. The head 34 of the valve 30 is subject to the gear stage pressure in the line 35 which transmits liquid under pressure from the gear stage to the piston stage. As the delivery pressure rises, the off-loading valve 32 operates, as described in British Specification No. 582,281, to relieve the pressure from the line 35 back, through a line 37, to the inlet of the pump. It is preferred to employ an off-loading valve of the construction described in United States application Serial No. 165,276 in order that, as therein described, the pump should approach more closely to the theoretical ideal, i. e. that its delivery should, over the operating range, be inversely proportional to its delivery.

The pressure in the delivery line 29 of the constant work pump 19 is supplied to an inlet 38 in the cylinder block 13 and normally holds a tubular non-return valve 39 open against a spring 40, so obtaining access to a port 41 associated with a control valve 42. Other ports 43 associated with the valve 42 communicate with a return line 44. As will readily be seen, movement of the valve 42 will effect alternative pressure and exhaust connections, according to the direction of its movement, to passages 45, 46 leading to opposite ends of the cylinder 12, thereby causing movement of the cylinder block 13 in relation to the piston 10, in the same direction as that in which the valve 42 has moved, until the ports 41, 43 are again sealed by the valve 42.

The pilot's input member 47 is connected to a member 48, pivoted at 49 and having a nose 50 which is movable between stops 51 on the cylinder block 13. The member 47 is connected, by links 52, 52ª to links 53, 53ª. The link 53 is pivoted at 54 to a collapsible member 55, of the construction described in United States application Serial No. 164,653.

The member 55 carries a catch 56 which coacts with a catch 57 on a leaf spring 60, pivoted at 58 to the cylinder block 13, to hold a plunger 59, mounted to slide in the valve 39, in the position shown. The inner end of the plunger 59 extends into a chamber 61 communicating with one end of the cylinder 12 via passage 45, while the other end of the cylinder 12 communicates, via passage 46, with a port 62 which is normally sealed by the end of the plunger 59. The area of the port 62 is equal to half the cross sectional area of the plunger stem enclosed in the chamber 61, so that the plunger 59 is subjected to equal outward loads by a given pressure existing at either end of the cylinder 12.

A subsidiary function of the spring-loaded plunger 59 is to prevent excessive pressure being generated at either end of the cylinder 12 due to excessive reaction load from the control surface. The leaf spring 60 is so designed that the plunger 59 may lift against it, under excessive pressure on its inner end, or on the differential area thereof exposed to the pressure in the chamber 61, thereby relieving the pressure in the cylinder. The plunger 59 will of course move down again to sealing position when the reaction load has returned to a safe value.

The main function of the spring-loaded plunger is however fulfilled when the collapsible member 55 collapses due to seizure of the control valve 42 and consequent additional effort exerted by the pilot on the input member 47. The catch 56 is then removed from the catch 57 on leaf spring 60, which is thus disabled whereupon the plunger 59 is moved outwards by the hydraulic pressure acting on its inner end, affording free communication between the two ends of the cylinders 12. As the plunger 59 moves outwards a collar 63 on it closes the non-return valve 39 and cuts off the pressure supply to the control valve 42.

Normally, movement of the input member 47 will rock the links 53, 53a in opposite directions about their points 54, 54a of pivotal attachment to their respective collapsible members 55, 55a to move the control valves 42, 43a in the same direction, thereby admitting hydraulic fluid to the corresponding ends of the two cylinders 12, 12a and establishing exhaust connections to the opposite ends of the jack cylinders.

If, however, one of the control valves, say the control valve 42, seizes, the force exerted by the pilot on the input member 47 will collapse the associated collapsible member 55. The plunger 59 will then move outwards, as already described, to close the valve 39, thereby cutting off the pressure supply from a seized control valve 42, and also to establish through passage 45, chamber 61 and passage 46, a by-pass connection between opposite ends of the cylinder 12. The failed jack accordingly offers no resistance to continued operation of the output member by the other jack, which is controlled by the control valve 42a. After the member 55 has collapsed, the link 53 turns idly, in response to movement of the input member 47, about its point of attachment 64 to the valve 42 which is provided with stops (not shown) for limiting its movement in relation to its housing. If the pressure supply to both jacks fails, the non-return valves 39, 39a will close. Valves 74, 74a then permit, as described in British Specification No. 627,737, circulation of trapped liquid within the system so that the cylinder block 13 may be moved manually by coaction of the nose 50 on the member 48 with one or other of the stops 51.

In the arrangement shown in Figs. 3, 3a and 3b, two hydraulic motors 17, 17a serve to operate a control surface. Parts associated with these motors which correspond to parts shown in Fig. 2 bear the same reference numerals. Also parts associated with the motor 17a which correspond to parts associated with the motor 17 bear the same reference numerals, with the addition of the suffix a.

Each of the motors 17, 17a receives its pressure supply from one of a pair of constant work pumps 19, 19a which are generally similar to those shown in Fig. 2. In Fig. 3, however, is shown an electric motor 65 for driving the pump, and a charging valve 66 for the pump, and the gear stage 20 of the pump constitutes also a reduction gear for driving the shaft 24 of the piston stage. Also, certain of the plungers 22 of the plunger stage receive their backing pressure from the line 35 through a central passage 67 in the off-loading valve 30 and a line 68. The off-loading valve 30 consequently operates, as described in United States application Serial No. 165,276, at a certain delivery pressure to render inoperative those of the cylinders of the plunger stage which are connected to the line 68, leaving operative only those of the cylinders which are connected to the line 35.

The delivery line 29 of the pump is connected to the inlet 38 (Fig. 3a) and supplies pressure to the port 41 of the control valve 42 through a normally open valve 82. The valve 82 is held open under normal conditions, against a spring 83, by a latch 84, pivoted at 85, and coacting with a projection 86 on the collapsible member 55. Collapse of the member 55 will free the latch 84 to allow the spring 83 to close the valve 82 and cut off the pressure supply to the valve 42.

The pilot's input member 47 is connected to a link 69 which, on movement of the input member, turns about a pivot 70 to shift a linkage 71, 72, 72a, 73, 73a, thereby moving the two control valves 42, 42a in the same direction.

But one of the hydraulic motors, 17, will be described, the other 17a, being of precisely similar construction. The motor 17 (Fig. 3b) comprises a shaft 75, carrying a pair of eccentrics 76, 77 spaced at 180° (i. e. in antiphase) on the shaft. Associated with the eccentric 76 is a set of six cylinders, each containing a piston 78, these cylinders being located radially in relation to the shaft 75. A similar set of six cylinders each containing a piston 79, is associated with the eccentric 77. Associated with each aligned pair of cylinders is one of six distributing valves 80, each of which is held by a spring 81 in contact with a swashplate 182 on the shaft 75. For simplicity but one pair of aligned cylinders, containing pistons 78, 79 and but one associated distributing valve 80, are shown in Fig. 3b.

On displacement of the control valve 42, it establishes alternative pressure and exhaust connections to lines 87, 88 leading to each of the distributing valves 80. This results in sympathetic movement of the pistons 78, 79 thereby actuating the eccentrics 76, 77 to rotate the shaft 75 in a direction determined by the direction of movement of the control valve 42. Thus, if line 87 is connected to pressure, and line 88 to exhaust, the piston 78 will be caused to move in and the piston 79 to move out. As the shaft 75 rotates, the swashplate 182 imparts continuous reciprocating movement to all of the valves 80 so that the associated pistons 78, 79, will be alternately connected, at the proper times, to pressure and exhaust.

The shafts 75, 75a of the two motors drive, through gear wheels 89, 89a, a common gear wheel 90 connected to the output shaft 18. This, in turn, is connected by bevel gearing 91 to a threaded sleeve 92, engaging a pair of screw jacks 93 which are moved inwards or outwards, according to the direction of rotation of the sleeve 92, to impart movement to the two portions of the control surface, not shown.

In screw threaded engagement with the boss of the gear wheel 90 is a follow-up rod 94 which operates, by rocking the link 69 about its pivotal attachment 95 to the input member 47, to return the control valves 42, 42a to neutral position.

On seizure of either control valve, say 42, the associated collapsible member 55 collapses, freeing the catch 84 and allowing the valve 82 to close, as already described, to cut off the pressure supply to the valve 42. When the valve 82 closes, its stem 96 moves into position to open a connection between the lines 87, 88, thereby allowing the hydraulic motor 17 to run freely, as it is driven through the gears 90, 89 on continued operation of the still effective motor 17a.

Interlocking plungers 97, 97a are provided between extensions 98, 98a of the two collapsible members 55, 55a. These operate, as described in U. S. application Serial No. 164,759 when either of the members 55, 55ᵃ collapses, to lock the other against collapse.

Figure 4:
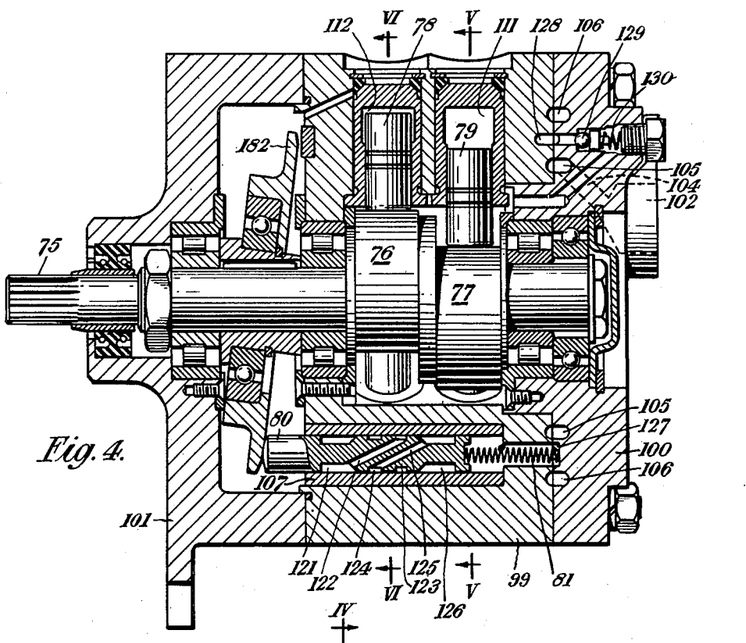
Figs. 4–14 are views of a practical form of hydraulic motor for use in the system shown in Fig. 3, Fig. 4 being a section on the line IV—IV in Fig. 5, Fig. 5 being a right hand end elevation of the motor partly in section on the line V—V in Fig. 4, Fig. 6 being a right hand elevation of the motor, with the end cover plate, pistons, eccentrics and valves removed, partly in section on the line VI—VI in Fig. 4, Fig. 7 being a plan view of the cylinder block, which has been rotated through 90° from the position shown in Fig. 4, Figs. 8 and 9 being sections respectively on lines VIII—VIII and IX—IX in Fig. 7, Fig. 10 being an enlarged longitudinal section through one of the valve sleeves and Figs. 11-14 being sections taken respectively on lines XI—XI, XII—XII, XIII—XIII and XIV—XIV in Fig. 10.

As above stated, Figs. 4–14 show a practical form of hydraulic motor for use in the system shown in Figs. 3 and 3a. As shown in Fig. 4, the pump casing consists of three parts, viz. a cylinder block 99 and two end plates 100, 101. The cover plate 100 has two unions 102, 103 for connection respectively to the lines 87, 88 (Fig. 3b). The union 102 communicates, via a passage 104, with an annular groove 105, and the other union 103 communicates, via a similar passage, not shown, with an annular groove 106.

Each of the distributing valves 80 is reciprocably mounted in a valve sleeve 107 alongside which run four longitudinal grooves in the cylinder body. Two of these grooves 108, which communicate with the annular groove 106 (see Fig. 6) extend for nearly the whole length of the valve sleeve 107 (see Fig. 7) while the other two grooves 109, which are shorter, communicate with the annular groove 105.

Figure 7:
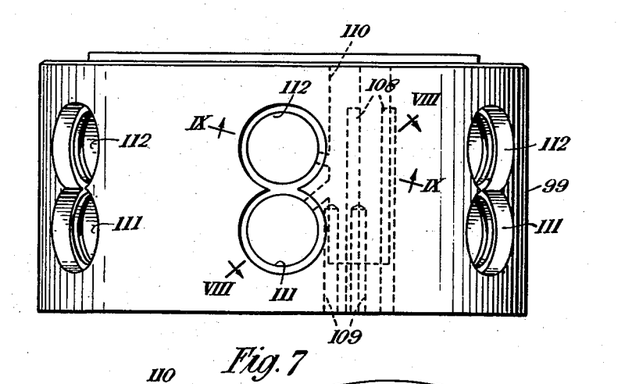
Figure 8:
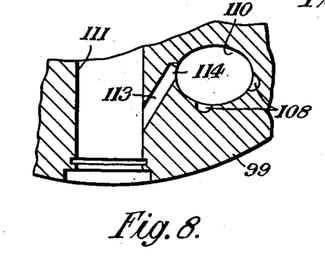
Figure 9:
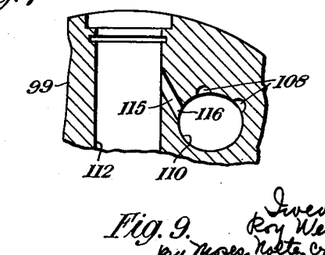
Figure 10:
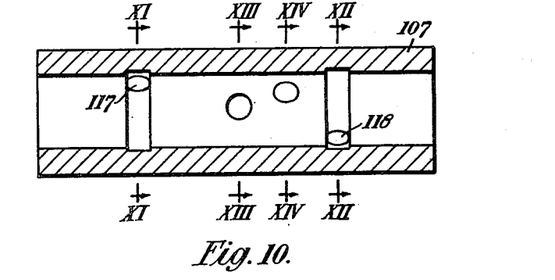
Figure 11:
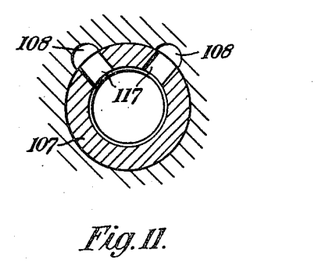
Figure 12:
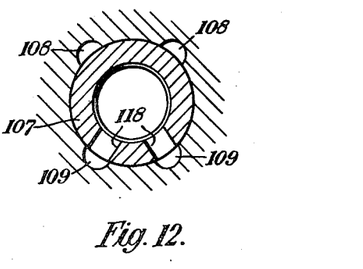
Figure 13:
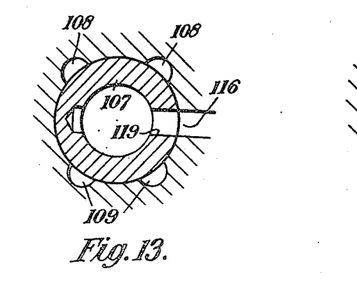
Figure 14:
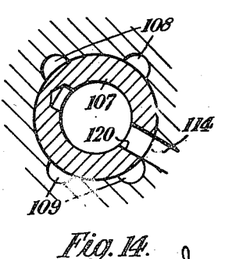

As will be apparent from Figs. 7–9, the bore 110 containing each valve sleeve 107 is offset from the pair of aligned cylinders 111, 112 which the associated distributing valve 80 is to control, the cylinders 111 being those containing the pistons 79 and the cylinders 112 those containing the pistons 78. The cylinder 111 communicates (Fig. 8) by a passage 113 with a port 114 in the bore 110, and the cylinder 112 communicates (Fig. 9) by a passage 115 with a port 116 in the bore 110.

As indicated in Figs. 10–14, the valve sleeve 107 has a pair of ports 117 which communicate with the grooves 108, a pair of ports 118 which communicate with the grooves 109, a port 119 which communicates with the port 116 and the cylinder 112 and a port 120 which communicates with the port 114 and the cylinder 111.

Turning now to Fig. 4, the distributing valve 80 has an annular groove 121, communicating by a passage 122 with an annular groove 123, and an annular groove 124, communicating by a passage 125 with an annular groove 126. The valve 80 shown in Fig. 4 is in its extreme left hand position. The right hand end of the groove 121 then communicates with the port 117 in the valve sleeve, and therefore with the grooves 108, annulus 106 and union 103, while the groove 123 communicates with the ports 119, 116 and therefore with the cylinder 112. The right hand end of the groove 124 communicates with the ports 118, and therefore with the grooves 109, annulus 105 and union 102, while its left hand end communicates with the ports 120, 114 and therefore with the cylinder 111. Therefore, assuming the union 102 to be connected to pressure and the union 103 to be connected to exhaust, pressure liquid will be admitted to the cylinder 111 to urge its piston 79 inwards to drive the shaft 75, while the piston 78 will be expelling liquid from its cylinder 112 to exhaust.

When the swashplate 182 has moved the valve 80 to its extreme right hand end position these connections to the associated cylinders will be reversed. The groove 121 remains in register with the ports 117, and therefore with the union 103, but the groove 123 is now brought into register with the ports 120, 114 and therefore with the cylinder 111, which is now connected to exhaust. The groove 124 remains in register with the ports 118, and therefore with the union 102, but is brought out of register with the ports 120, 114. The groove 126, however, is brought into register with the ports 119, 116 so connecting the cylinder 112 to pressure.

The valve 80 is thus reciprocated so as periodically to reverse the pressure and exhaust connections to the aligned pair of cylinders 111, 112 with which it is associated. It will readily be understood that, if the pressure and exhaust connections to the unions 102, 103 are reversed, the motor will be driven in the reverse direction.

Figure 5:
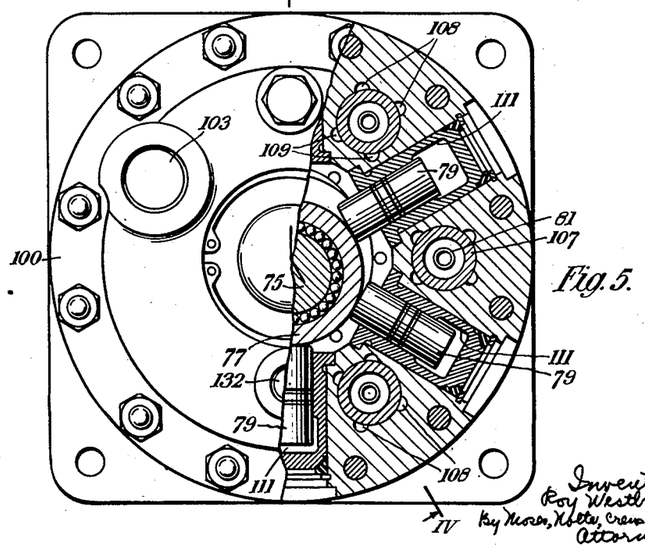
Figure 6:
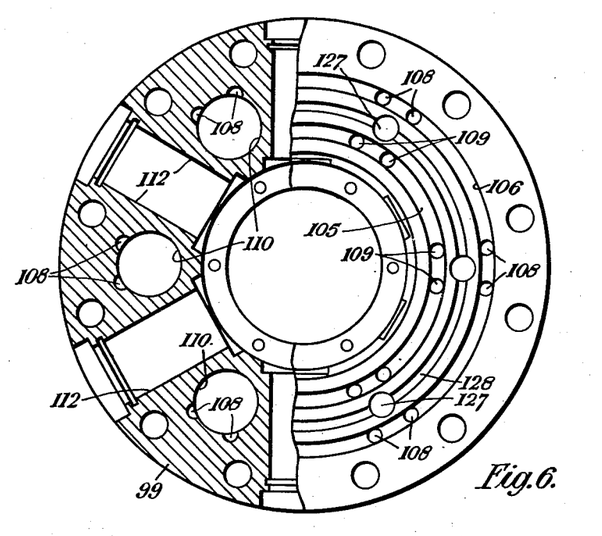

Liquid escaping past the valves 80 collects in the spaces 127 (Fig. 4) housing the valve springs 81 and thence passes into an annulus 128. This liquid can flow from the annulus 128, through a non-return valve 129, loaded by a spring 130, to a space 131 communicating with a discharge outlet 132 (Fig. 5).

Seizure of any sliding part of the motor will not interfere with rotation of its shaft 75 by the other motor. Thus, if a piston seizes it is almost certain to seize at the end of its discharge stroke, in which position it cannot obstruct the movement of the associated eccentric. The valves 80 are urged into contact with the swashplate 182 not only by their return springs 81, but also by the back pressure of leakage liquid which is maintained in the spaces 127 by the spring loaded valve 129, which may be 40 lbs./sq. in. The valves 80 are therefore not likely to stick, but, if a valve 80 does stick, its spring 81 will be unable to return it and the associated pair of aligned cylinders 111, 112 will be rendered ineffective. Furthermore, when the pressure supply is cut off, the motor can free-wheel indefinitely, since the pistons will be pushed outwards by the eccentrics and there will be nothing to return them.

What I claim as my invention and desire to secure by Letters Patent is:

1. In apparatus for moving, through two independent hydraulic power units, an output member common to the two units under the control of a manually operable input member also common to the two units, the combination of a pair of hydraulic actuators which are directly coupled to said output member, each actuator comprising a control valve coupled to and movable by said input member to establish a flow of liquid through said actuator in one of two directions, according to the direction of movement of said control valve, and thereby to move the output member in a direction and to a position determined by the movement imparted to said input member, a conduit for permitting liquid to circulate freely in said actuator, a valve normally closing said conduit and means operative in the event of seizure of the control valve for opening said normally closed valve to permit liquid to circulate in said conduit so that the actuator will not obstruct continued movement of the output member by the other actuator, and a pair of hydraulic pumps for supplying liquid under pressure individually to said actuators under the control of their control valves, each pump being a two stage pump and comprising an off-loading valve subject to the delivery pressure of the second stage of the pump for relieving, as said delivery pressure increases, the pressure at which liquid is delivered from the first to the second stage of the pump, so that the delivery pressure of the pump, over a predetermined range of delivery pressures, is approximately inversely proportional to the rate at which said pump delivers liquid, said pumps operating, so long as both actuators are effective, at approximately half their maximum delivery pressure so that, in the event of failure of either actuator, the pump supplying the other actuator may double its delivery pressure and halve its rate of delivery thereby permitting of continued operation of the output member with the same power as previously but at half the speed.

2. In apparatus for moving, through two independent hydraulic power units, an output member common to the two units under the control of a manually operable input member also common to the two units, a combination as claimed in claim 1, wherein the second stage of each pump is a plunger stage and comprises a plurality of barrels, each containing a plunger, and a cam for imparting delivery strokes to said plungers, said plungers being returned on the suction stroke by the pressure of the liquid supplied to the second stage of the pump from the first stage thereof.

3. In apparatus for moving, through two independent hydraulic power units, an output member common to the two units under the control of a manually operable input member also common to the two units, a combination as claimed in claim 1, wherein the second stage of each pump is a plunger stage and comprises a plurality of barrels, each containing a plunger, and a cam for imparting delivery strokes to said plungers, said plungers being returned on the suction stroke by the pressure of the liquid supplied to the second stage of the pump from the first stage thereof, and wherein the off-loading valve of each pump is arranged, at a predetermined delivery pressure, to render certain of the plungers of the second stage inoperative, while leaving the other plungers operative.

4. In apparatus for moving, through two independent hydraulic power units, an output member common to the two units under the control of a manually operable input member also common to the two units, a combination as claimed in claim 1, wherein each actuator is constituted by a hydraulic motor, comprising a motor shaft, a pair of eccentrics on the shaft, said eccentrics being disposed on the shaft in antiphase, a bank of cylinders disposed radially in relation to each eccentric, the cylinders in the two banks being aligned in pairs, pistons in the cylinders for driving the eccentrics, a number of distributing valves, one associated with each aligned pair of cylinders, pressure and exhaust connections to the distributing valves which are reversible by the control valve associated with the motor, and means on the shaft for imparting reciprocating movement to the distributing valves so that each connects its associated pair of cylinders alternately to pressure and exhaust.

ROY WESTBURY.

REFERENCES CITED

The following references are of record in the file of this patent:

UNITED STATES PATENTS

| Number | Name | Date |
|---|---|---|
| 2,445,090 | Pritchard | Nov. 30, 1948 |